United States Patent
Nakayama

(10) Patent No.: US 11,330,190 B2
(45) Date of Patent: May 10, 2022

(54) IMAGE PROCESSING APPARATUS, METHOD OF PROCESSING IMAGE AND STORAGE MEDIUM

(71) Applicant: CANON KABUSHIKI KAISHA, Tokyo (JP)

(72) Inventor: Fumitaka Nakayama, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/019,411

(22) Filed: Sep. 14, 2020

(65) Prior Publication Data
US 2021/0099633 A1  Apr. 1, 2021

(30) Foreign Application Priority Data
Sep. 26, 2019  (JP) .............................. JP2019-176043

(51) Int. Cl.
*H04N 5/235* (2006.01)
*H04N 5/243* (2006.01)

(52) U.S. Cl.
CPC ......... *H04N 5/2355* (2013.01); *H04N 5/2351* (2013.01); *H04N 5/2353* (2013.01); *H04N 5/243* (2013.01)

(58) Field of Classification Search
CPC .. H04N 5/2355; H04N 5/2351; H04N 5/2353; H04N 5/243; H04N 1/3871; H04N 5/2356; H04N 5/23229; H04N 5/265; G06T 2207/20221; G06T 2207/20208; G06T 2207/10144; G06T 5/50
See application file for complete search history.

(56) References Cited

U.S. PATENT DOCUMENTS

| | | | |
|---|---|---|---|
| 9,646,397 B2 | 5/2017 | Nashizawa et al. | |
| 10,560,640 B2 | 2/2020 | Kamiya | |
| 2012/0218442 A1 | 8/2012 | Jandhyala et al. | |
| 2012/0249844 A1* | 10/2012 | Saito | .............. H04N 5/2355 348/242 |
| 2014/0176745 A1 | 6/2014 | Pajak et al. | |
| 2015/0036878 A1* | 2/2015 | Nashizawa | .............. G06T 5/50 382/103 |
| 2017/0230566 A1* | 8/2017 | Ishii | .............. H04N 5/23209 |

(Continued)

FOREIGN PATENT DOCUMENTS

| | | |
|---|---|---|
| EP | 2624204 A2 | 8/2013 |
| EP | 3157251 A1 | 4/2017 |

(Continued)

OTHER PUBLICATIONS

Feb. 17, 2021 European Search Report in European Patent Appln. No. 20196839.3.

*Primary Examiner* — Gevell V Selby
(74) *Attorney, Agent, or Firm* — Venable LLP

(57) ABSTRACT

An image processing apparatus obtains a plurality of captured images captured by an image capturing unit under different conditions, performs HDR development of the plurality of captured images to obtain a plurality of HDR images, generates composition information for compositing the plurality of HDR images, using a plurality of images corresponding to the plurality of captured images, the plurality of images being not influenced by or less influenced by tone processing resulting from the HDR development, and composites the plurality of HDR images using the composition information.

16 Claims, 10 Drawing Sheets

(56) References Cited

U.S. PATENT DOCUMENTS

| | | |
|---|---|---|
| 2017/0230577 A1 | 8/2017 | Ishii |
| 2017/0237913 A1* | 8/2017 | Kiser .................. G02B 27/145 348/262 |
| 2019/0045137 A1* | 2/2019 | Kamiya ............... H04N 5/2351 |
| 2020/0112688 A1 | 4/2020 | Kamiya |

FOREIGN PATENT DOCUMENTS

| | | |
|---|---|---|
| JP | 2008-167418 A | 7/2008 |
| JP | 2013-240031 A | 11/2013 |
| JP | 2016-197854 A | 11/2016 |
| JP | 6046966 B2 | 12/2016 |
| JP | 2017-045030 A | 3/2017 |
| JP | 2018-037857 A | 3/2018 |
| JP | 6460014 B2 | 1/2019 |

* cited by examiner

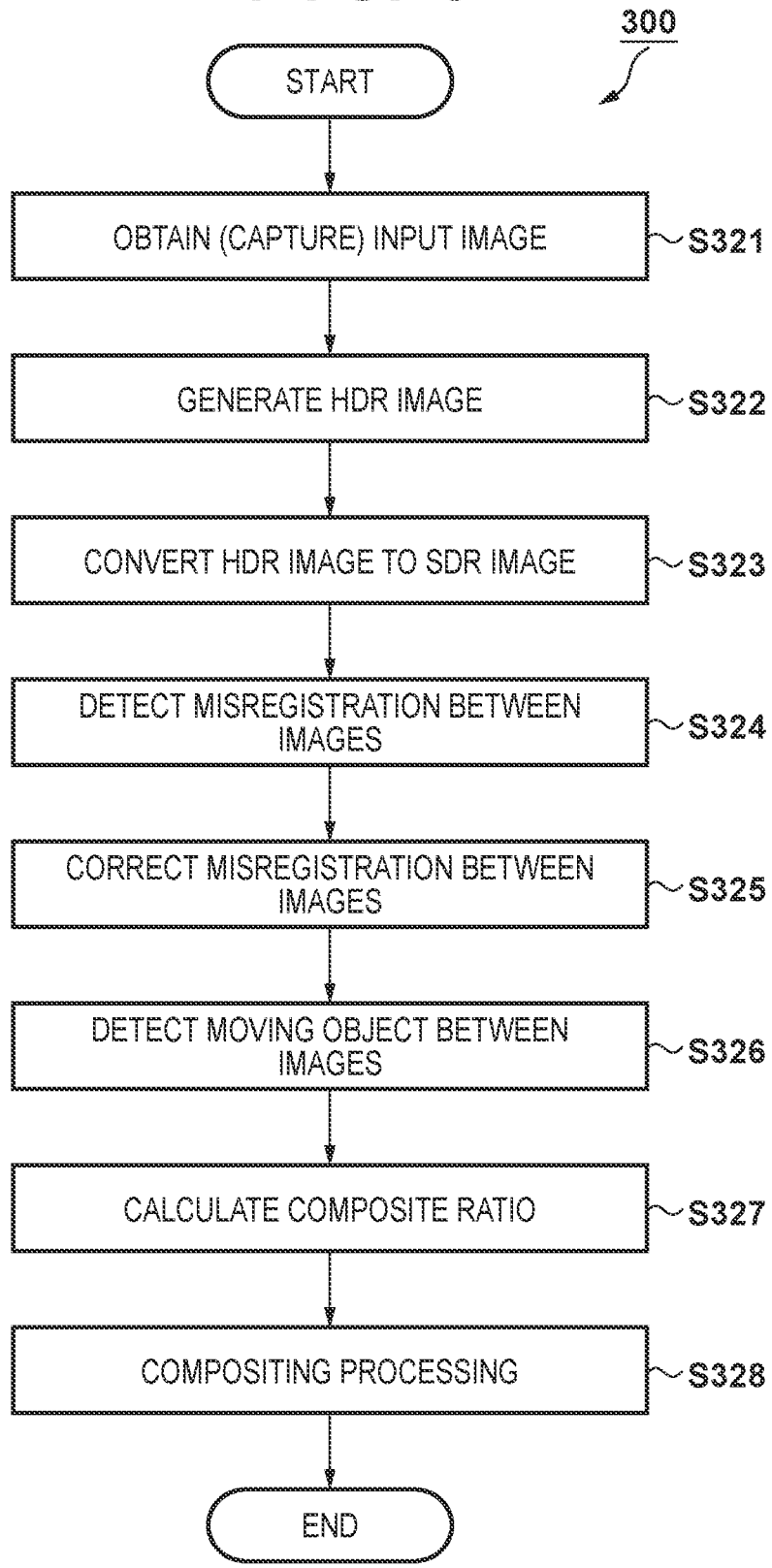

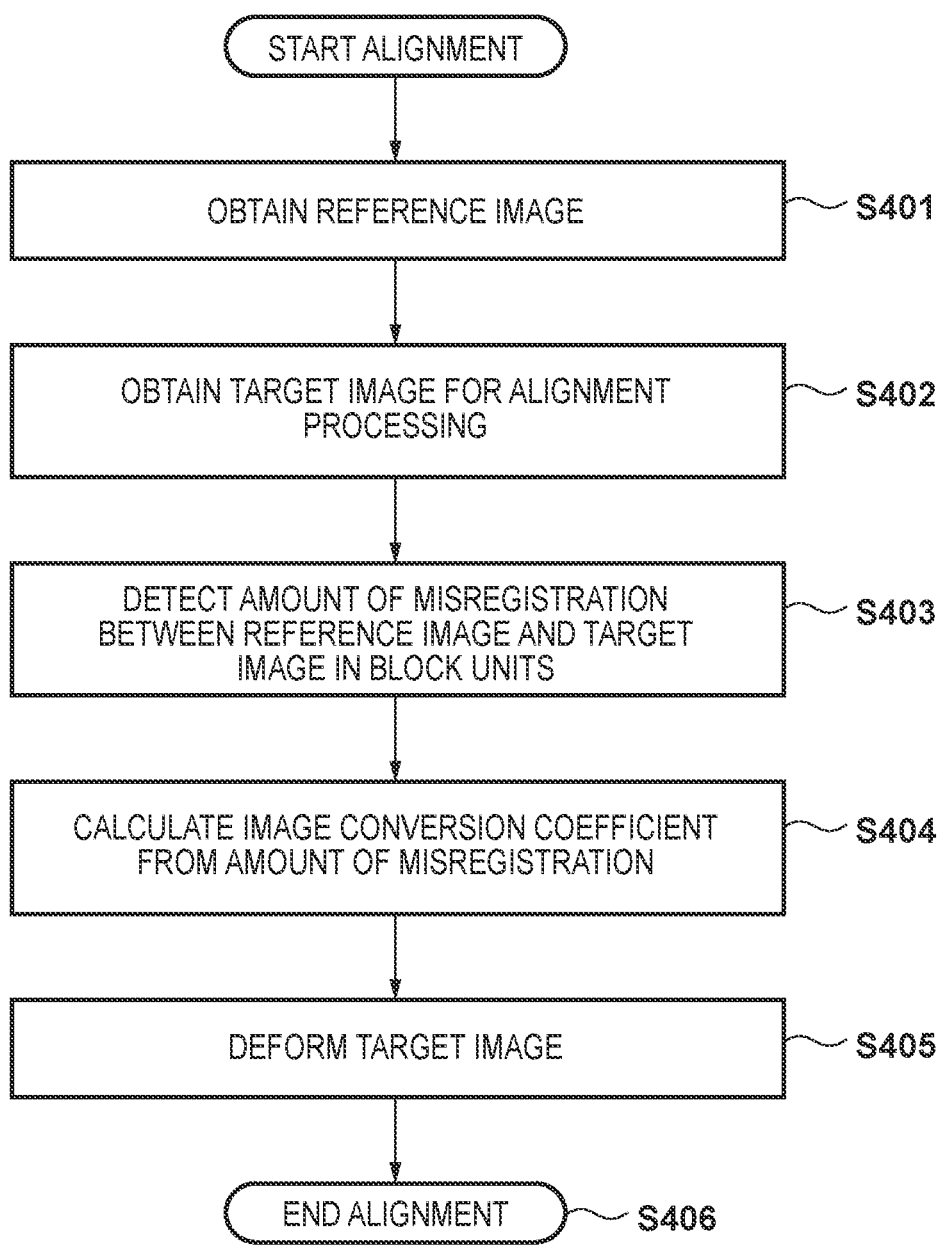

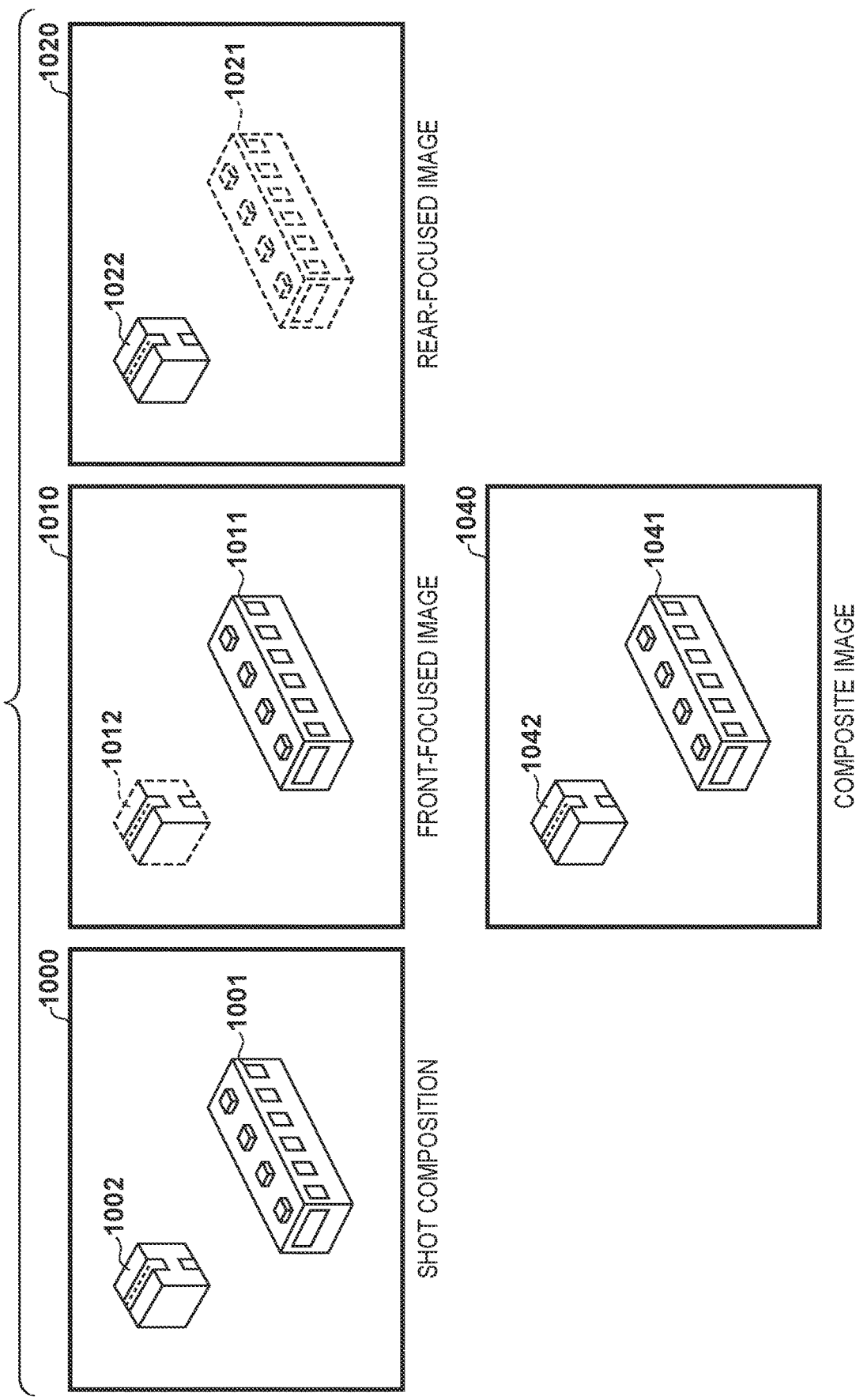

IMAGE PROCESSING APPARATUS, METHOD OF PROCESSING IMAGE AND STORAGE MEDIUM

BACKGROUND OF THE INVENTION

Field of the Invention

The present invention relates to an image processing apparatus, a method of processing an image, and a storage medium.

Description of the Related Art

As the brightness of displays has increased in the recent years, HDR camera systems have been proposed that are capable of reproducing tones on the high-brightness side, which have been compressed in the past, as tones closer to what they would appear to the human eye.

Japanese Patent No. 6460014 discloses a camera that outputs a high dynamic range (HDR) signal by applying a gamma curve that has an inverse characteristic of the EOTF characteristics described in ST2084, BT2100, etc., of the HDR standard. There is a technique (HDR composition) for compositing multiple images captured at different exposures (for example, a high-exposure image, a proper-exposure image, and a low-exposure image). For misregistration generated between the different exposures during such composition, Japanese Patent No. 6046966 discloses a technique for generating a high-quality composite image by detecting the amount of misregistration between the images and correcting the registration, and by detecting an object moving between images and changing the composite ratio for the moving object.

However, in particular, the gamma curve corresponding to an HDR standard, such as ST2084, has a steeper rise in the dark areas and a collapsed light area, compared with those of a standard dynamic range (SDR). As a result, the tone characteristics after HDR development are significantly different relative to the brightness of the subject. When the amount of misregistration between images is to be detected with a signal after HDR development, there is a problem in that the accuracy of detecting the amount of misregistration and the moving object regions is reduced due to a difference in the tone characteristics, and thereby the quality of the composite image decreases.

SUMMARY OF THE INVENTION

One aspect of the present invention provides a technique for improving the accuracy of composition information used for compositing developed images corresponding to an HDR standard and generating a high-quality composite image.

According to one aspect of the present invention, there is provided an image processing apparatus comprising: an obtaining unit configured to obtain a plurality of captured images captured by an image capturing unit under different conditions; a developing unit configured to perform HDR development of the plurality of captured images to obtain a plurality of HDR images; a generating unit configured to generate composition information for compositing the plurality of HDR images, using a plurality of images corresponding to the plurality of captured images, the plurality of images being not influenced by or less influenced by tone processing resulting from the HDR development; and a compositing unit configured to composite the plurality of HDR images using the composition information.

According to another aspect of the present invention, there is provided a method of processing an image, comprising: obtaining a plurality of captured images captured by an image capturing unit under different conditions; performing HDR development of the plurality of captured images to obtain a plurality of HDR images; generating composition information for compositing the plurality of HDR images, using a plurality of images corresponding to the plurality of captured images, the plurality of images being not influenced by or less influenced by tone processing resulting from HDR development; and compositing the plurality of HDR images using the composition information.

According to another aspect of the present invention, there is provided a non-transitory computer-readable storage medium storing a program for causing a computer to execute a method of processing an image, the method comprising: obtaining a plurality of captured images captured by an image capturing unit under different conditions; performing HDR development of the plurality of captured images to obtain a plurality of HDR images; generating composition information for compositing the plurality of HDR images, using a plurality of images corresponding to the plurality of captured images, the plurality of images being not influenced by or less influenced by tone processing resulting from HDR development; and compositing the plurality of HDR images using the composition information.

Further features of the present invention will become apparent from the following description of exemplary embodiments with reference to the attached drawings.

BRIEF DESCRIPTION OF THE DRAWINGS

FIG. 3 is a flowchart illustrating the operation of an image capturing apparatus according to the first embodiment.

FIG. 4 is a flowchart illustrating processing of misregistration detection and registration correction.

FIG. 10 is a diagram illustrating an overview of a third embodiment.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached draw-

First Embodiment

The first embodiment is a mode in which HDR development processing corresponding to an HDR standard, such as ST2084, is performed on multiple images having different exposures, and the images are composited and output. An example will now be described in which the number of images to be composited is three: a low-exposure image, a proper-exposure image, and a high-exposure image. Note that the term "proper-exposure image" refers to an image captured under an intermediate exposure condition between an exposure condition of the high-exposure image and an exposure condition of the low-exposure image, and the term does not refer to whether the exposure condition is actually proper or not.

Figure 1:
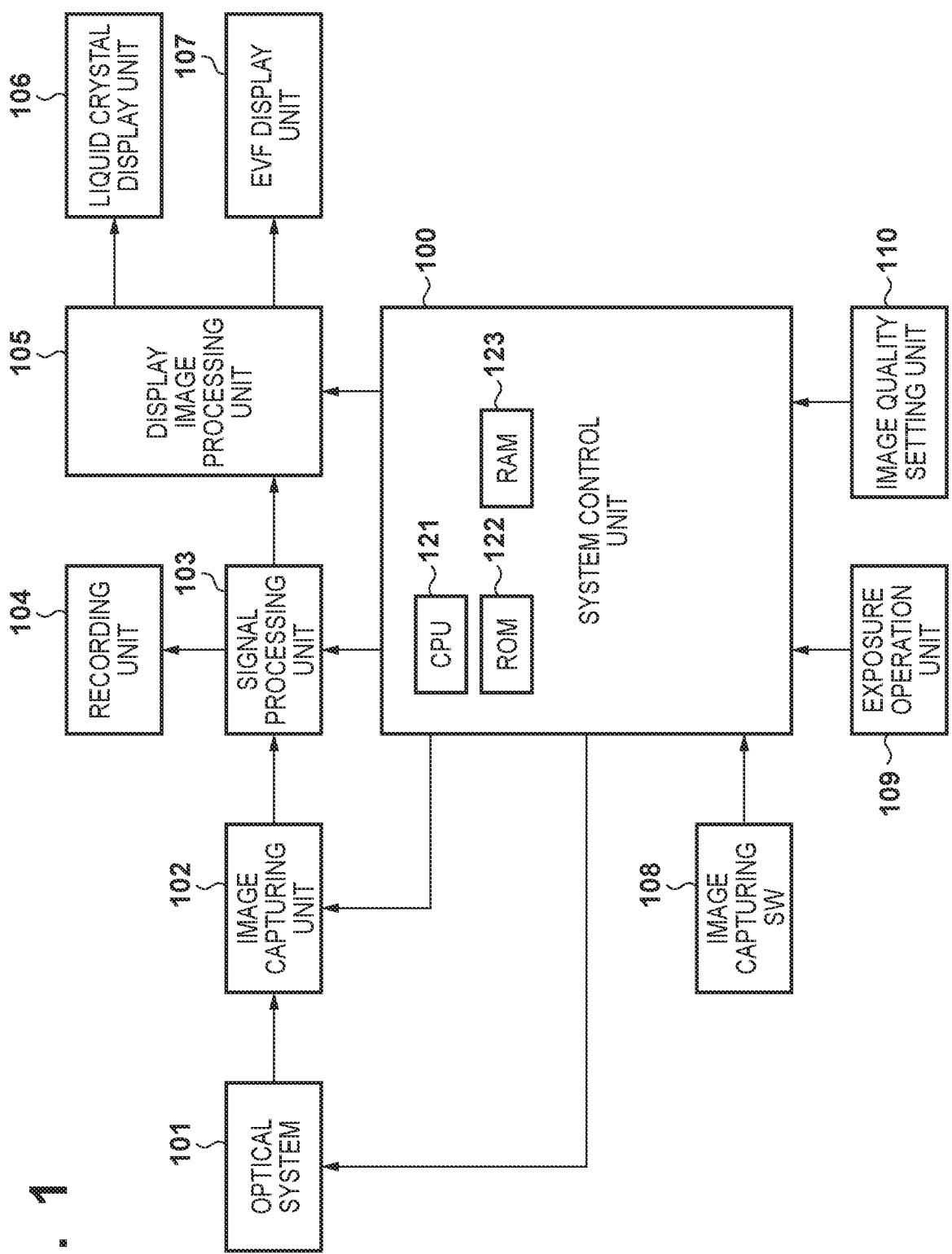
FIG. 1 is a block diagram illustrating a configuration example of an image capturing apparatus according to an embodiment.

FIG. 1 is a block diagram illustrating a configuration example of an image capturing apparatus according to the first embodiment. A system control unit 100 includes a CPU 121. The CPU 121 executes, for example, programs stored in a ROM 122, which is a read only memory, to realize various types of processing. A RAM 123, which is a random access memory, provides a work area for the CPU 121 to execute the various types of processing. An optical system 101, an image capturing unit 102, a signal processing unit 103, a display image processing unit 105, an image capturing SW 108, an exposure operation unit 109, and an image quality setting unit 110 are connected to the system control unit 100. The system control unit 100 detects a user operation via the image capturing SW 108, the exposure operation unit 109, and the image quality setting unit 110 and controls the operation of the optical system 101, the image capturing unit 102, the signal processing unit 103, and the display image processing unit 105. Note that at least some of the components coupled to the system control unit 100 may be included in the system control unit 100.

The optical system 101 includes a lens group including a zoom lens and a focus lens, an aperture adjustment device, and a shutter device. The optical system 101 drives the focus lens, performs exposure control of the aperture adjustment device and the shutter device, and the like, under the control of the system control unit 100 that has detected a user operation on the image capturing SW 108. The optical system 101 adjusts the aperture adjustment device and the shutter device to adjust the amount of light passing through the optical system 101, under the control of the system control unit 100 that has detected a user operation on the exposure operation unit 109. The image capturing unit 102 includes a photoelectric transducer, such as a CCD or a CMOS sensor, that photoelectrically converts the light flux of a subject that has passed through the optical system 101 to an electrical signal, and an A/D converter that converts the electrical signal output from the photoelectric transducer to a digital image.

The signal processing unit 103 performs correction, such as defective pixel correction and lens aberration correction, and signal processing, such as WB processing, NR processing, debayer processing, sharpness processing, and gamma correction processing, to the digital image output from the image capturing unit 102. The signal processing unit 103 performs compositing processing in which multiple images captured by the image capturing unit 102 under different image capturing conditions are obtained, HDR development of the multiple captured images is performed to obtain multiple HDR images, and the multiple HDR images are composited. Details of such compositing processing performed by the signal processing unit 103 will be described below with reference to FIGS. 2 to 6B.

The composite image generated by the signal processing unit 103 is output to the display image processing unit 105. When a predetermined user operation (full press) on the image capturing SW 108 is detected, the composite image generated by the signal processing unit 103 is output to a recording unit 104 as well. The recording unit 104 has a function of recording an image to, for example, an information recording medium, such as a memory card having an onboard semiconductor memory. The information recording medium may be detachable from the image capturing apparatus.

The display image processing unit 105 converts the composite image input from the signal processing unit 103 to an image suitable for a liquid crystal display unit 106 or an EVF display unit 107, in accordance with the control performed by the system control unit 100. The liquid crystal display unit 106, which is a display device without an eyepiece, and the EVF display unit 107, which is a display device with an eyepiece, display the image output from the display image processing unit 105. Note that these display units are not limited to liquid crystal displays, and alternatively may be organic electroluminescence (EL) displays.

Figure 2:
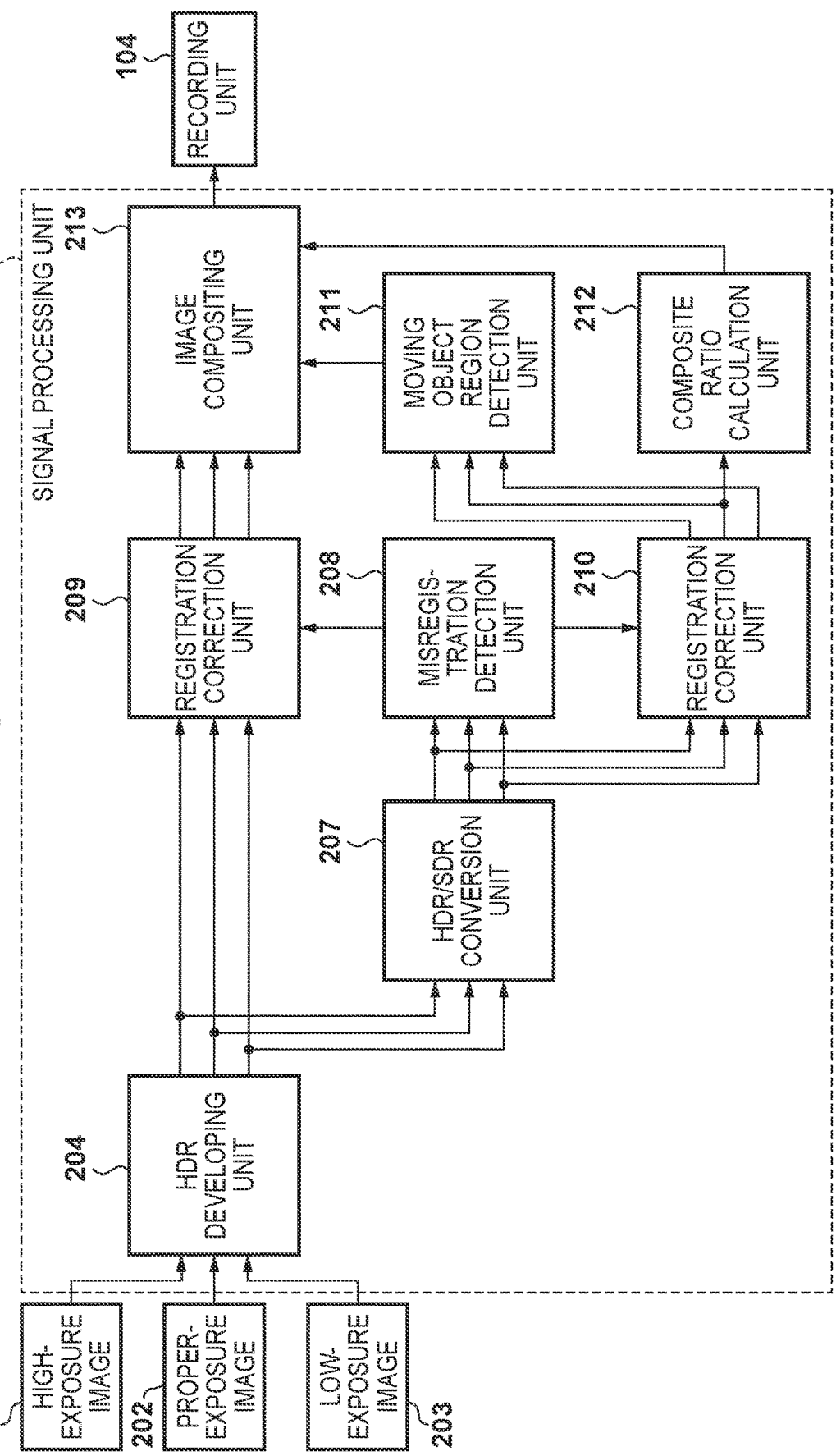
FIG. 2 is a block diagram illustrating a configuration example of a signal processing unit according to a first embodiment.
Figure 5A:
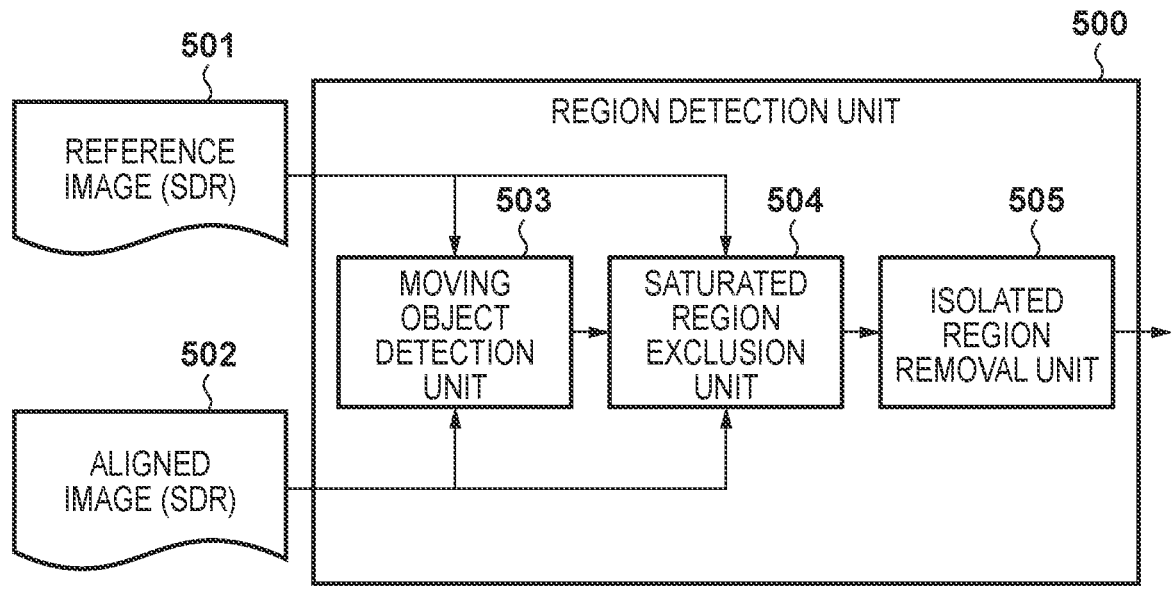
FIGS. 5A and 5B are block diagrams illustrating moving object detection processing.
Figure 5B:
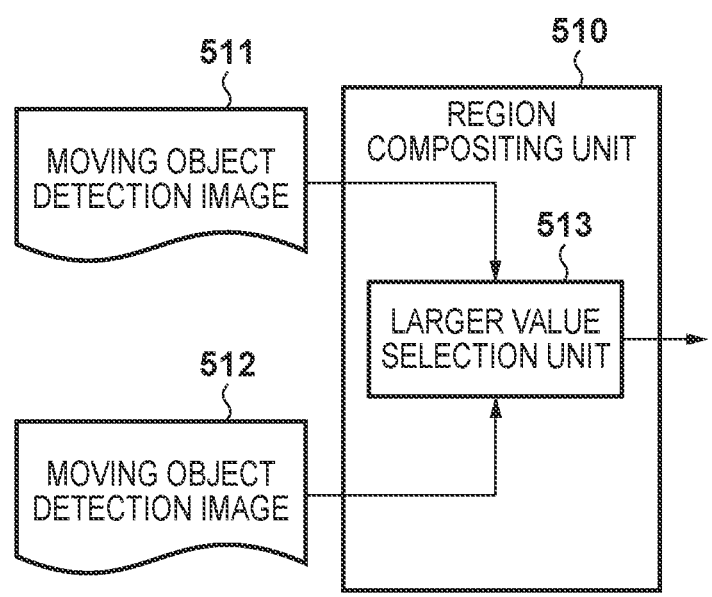
Figure 6A:
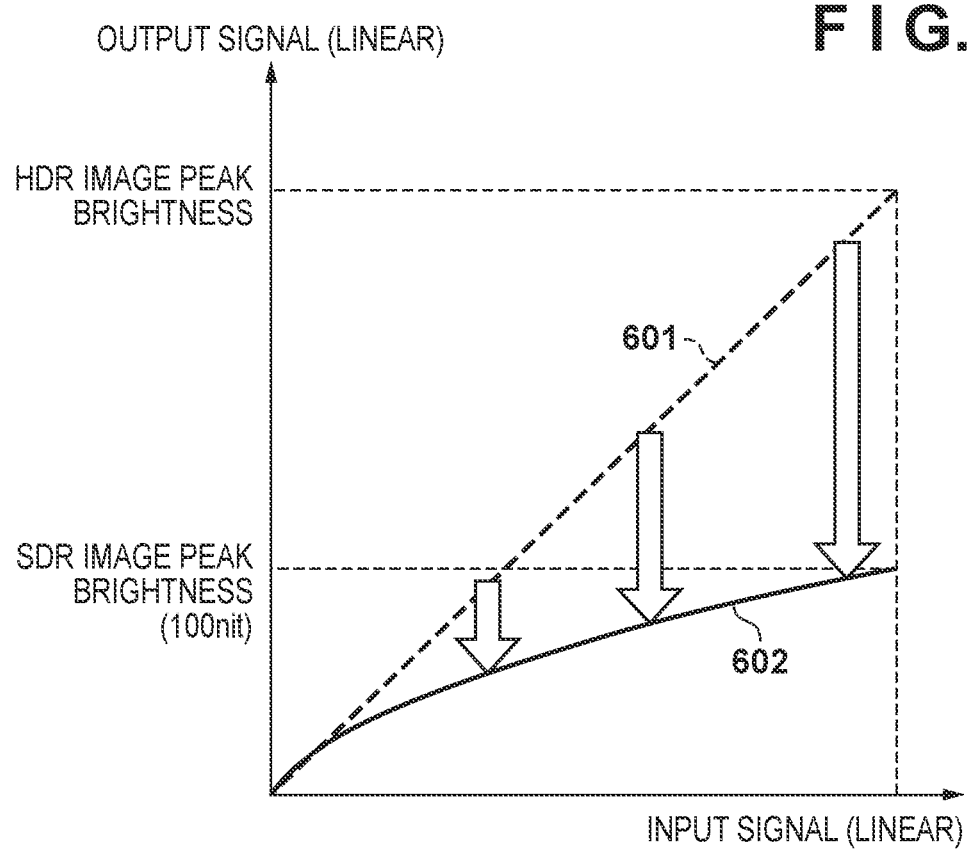
FIGS. 6A and 6B are block diagrams illustrating HDR/SDR conversion.
Figure 6B:
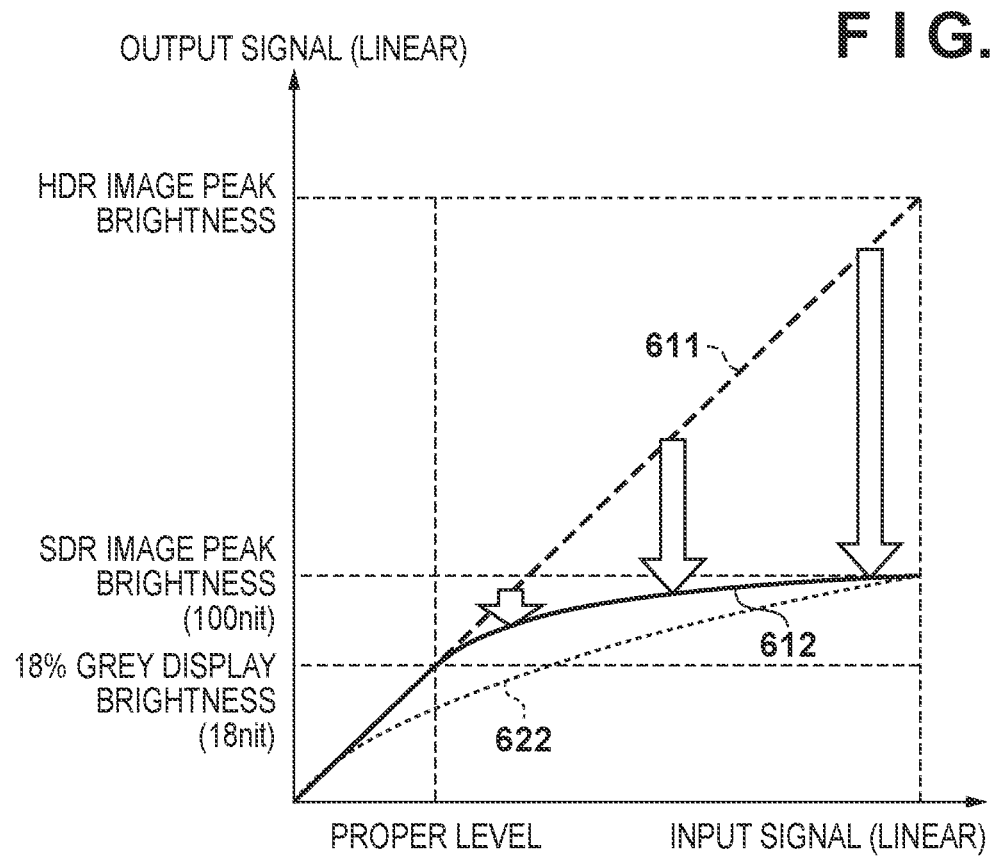

The configuration of the signal processing unit 103 of the image capturing apparatus according to this embodiment having the above-described configuration will now be described in detail with reference to FIGS. 2 to 6B. FIG. 2 is a diagram illustrating the signal processing unit 103, and the block defined by the dotted line corresponds to the signal processing unit 103. FIG. 3 is a flowchart illustrating the overall processing; FIG. 4 is a flowchart illustrating alignment processing (misregistration detection and registration correction); FIGS. 5A and 5B are diagrams illustrating moving object detection; and FIGS. 6A and 6B are diagrams illustrating conversion from an HDR development image to an SDR image.

In step S321, the image capturing unit 102 photoelectrically converts a subject image incident via the optical system 101 (lenses) to obtain a captured image. Note that, in the first embodiment, three images, namely, a high-exposure image 201, a proper-exposure image 202, and a low-exposure image 203, which are captured under different exposure conditions, are obtained as multiple images captured under different image capturing conditions.

In step S322, an HDR developing unit 204 of the signal processing unit 103 performs development processing (HDR development) on the digital images (the images captured under different exposure conditions) output from the image capturing unit 102. Specifically, the HDR developing unit 204 performs lens aberration correction, WB processing, NR processing, debayer processing, brightness correction, gamma conversion corresponding to an HDR standard, such as ST2084, and sharpness processing, to generate three HDR images from the above-mentioned three images. Note that since the exposure differs for the three images input to the HDR developing unit 204, parameters and the like need to be optimized, but the content of their processing is the same.

Steps S323 to S327 are processing for generating composition information used for compositing the three HDR images obtained by the HDR developing unit 204. The composition information is generated using multiple images corresponding to multiple captured images that are not influenced by or are less influenced by tone processing resulting from HDR development. In the first embodiment, a configuration is described in which images that are less influenced by tone processing resulting from HDR development are obtained by converting HDR images to SDR images.

In step S323, an HDR/SDR conversion unit 207 converts each of the three HDR images to an SDR image to generate three SDR images. The reason for generating SDR images is as follows. Since the three HDR images are time-split, it is necessary to correct the misregistration caused by camera shake between image capturing operations and correct moving objects included in the subject. However, as described in the related art, since the tone characteristics of HDR images significantly vary relative to the brightness of the subject, there is a problem in that when the amount of misregistration between the HDR images is to be detected, the detection accuracy decreases due to the difference in the tone characteristics. Therefore, in this embodiment, the HDR images are converted to SDR images, and the SDR images are used to generate information for correcting misregistration due to camera shake, detection information on a moving object included in the subject, and the like.

The conversion from HDR images to SDR images can be performed, for example, through a technique described in Japanese Patent Laid-Open No. 2008-167418. According to Japanese Patent Laid-Open No. 2008-167418, when an HDR image is displayed on an SDR display device (having peak brightness of 100 nits), processing is performed using tone mapping to keep the HDR image within the display brightness for SDR. Details of this processing will now be explained with reference to FIGS. 6A and 6B.

FIGS. 6A and 6B illustrate tone mapping for converting an HDR image to an SDR image, where the horizontal axis represents an input linear signal, and the vertical axis represents an output linear signal. In FIG. 6A, line 601 indicates the input/output characteristics of an HDR image, and line 602 indicates the input/output characteristics of an SDR image. In FIG. 6B, line 611 indicates the input/output characteristics of an HDR image, and line 612 indicates the input/output characteristics of an SDR image. The input/output characteristics 622 are the same as the input/output characteristics 602 illustrated in FIG. 6A. As indicated by the input/output characteristics 602, by subjecting the dark areas to low tone compression and gradually increasing the tone compression as the brightness increases, characteristics similar to the characteristics of the SDR images can be generated.

If the peak brightness of an HDR image is not high (for example, 1,000 nits or less), the tone mapping illustrated in FIG. 6A is sufficient. However, the peak brightness of an HDR image is defined up to 10,000 nits, and thus if the peak brightness of an HDR image is high (for example, 1,000 nits or more), the level of tone compression becomes high, and the conversion to SDR images may result in loss of signal tones. Therefore, as illustrated in FIG. 6B, tone compression is performed in such a manner that the input/output characteristics 611 of the HDR image and the input/output characteristics 612 of the SDR image are the same (same display brightness) from the black level to the proper level, and tone mapping is performed so that the tone compression ratio is increased as the brightness becomes higher than the proper level. Here, the proper level is, for example, a display brightness of approximately 18 nits for an image having a reference reflectance of 18% gray. With the tone mapping in FIG. 6B, tone compression is performed in such a manner that the tone of the HDR image near the proper level is equivalent to the brightness level of the SDR image near the proper level, and an SDR image retaining signal tonalities near the proper level can be generated. The above is the processing performed by the HDR/SDR conversion unit 207.

Referring back to the flowchart in FIG. 3, in step S324, a misregistration detection unit 208 detects the misregistration between the images using the SDR images. In step S325, a registration correction unit 209 and a registration correction unit 210 correct the misregistration between images on the basis of the misregistration detected by the misregistration detection unit 208. This processing will now be explained with reference to the flowchart in FIG. 4. Note that the registration correction unit 209 corrects the misregistration in a composite target image (HDR image), and the registration correction unit 210 corrects the misregistration in an output image (SDR image) from the HDR/SDR conversion unit 207. A moving object region detection unit 211 described below uses the SDR image whose misregistration has been corrected by the registration correction unit 210.

In step S401, the registration correction unit 209 obtains a reference image for alignment from the HDR images obtained by the HDR developing unit 204, and the misregistration detection unit 208 and the registration correction unit 210 obtain reference images for alignment from the converted SDR images. Although any reference image for alignment may be selected, in this embodiment, an HDR image obtained from the proper-exposure image 202 or an SDR image obtained from the proper-exposure image 202 is used as a reference image.

In step S402, the registration correction unit 209 obtains a target image for the alignment processing from the HDR images obtained by the HDR developing unit 204, and the misregistration detection unit 208 and the registration correction unit 210 obtain target images for the alignment processing from the converted SDR images. It is assumed that the target image is an image other than the reference image obtained in step S401 that has not been subjected to the alignment processing.

In step S403, the misregistration detection unit 208 calculates the amount of misregistration between the reference image and the target image, which are SDR images. An example of the calculation method will now be described. First, the misregistration detection unit 208 sets multiple blocks in the reference image. Next, search ranges are set in the target image at the same positions as the blocks in the reference image so that the search ranges are wider than the blocks. Finally, in each search range in the target image, a corresponding point is calculated where the sum of absolute differences (SAD) of the brightness with the blocks in the reference image is minimized. Misregistration is calculated as a vector representing the displacement between the center of each block in the reference image and the corresponding point described above. Note that the above-described corresponding point may also be calculated using the sum of squared differences (SSD), the normalized cross correlation (NCC), or the like, instead of the SAD.

In steps S404 and S405, the registration correction unit 209 and the registration correction unit 210 each calculate a transformation coefficient from the misregistration between the reference image and the target image, which is calculated by the misregistration detection unit 208, and aligns the image. Note that, for example, the transformation coefficient may be a projective transformation coefficient represented by the following Expression 1.

$$I' = \begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix} \quad \text{[Expression 1]}$$

(x', y') are the coordinates after deformation, (x, y) are the coordinates before deformation, and matrix A indicates the transformation coefficient calculated from the misregistration between the reference image and the target image. Note that the transformation coefficient A is not limited to a projective transformation coefficient, and may alternatively be an affine transformation coefficient or a simplified transformation coefficient for only horizontal and vertical shifts.

The operations of the misregistration detection unit 208, the registration correction unit 209, and the registration correction unit 210 are as described above.

Referring back to the flowchart of FIG. 3, in step S326, the moving object region detection unit 211 detects a moving object region using a proper-exposure image (SDR), a low-exposure image (SDR) corrected for misregistration, and a high-exposure image (SDR) corrected for misregistration. The configuration of the moving object region detection unit 211 will now be described with reference to FIGS. 5A and 5B.

The moving object region detection unit 211 includes a region detection unit 500 illustrated in FIG. 5A and a region compositing unit 510 illustrated in FIG. 5B. In FIG. 5A, a reference image 501 is a proper-exposure image (SDR) obtained from the HDR/SDR conversion unit 207. An aligned image 502 is an aligned low-exposure image (SDR) or an aligned high-exposure image (SDR) obtained from the registration correction unit 210. A moving object detection unit 503 of the region detection unit 500 detects a moving object region from the reference image 501 and the aligned image 502. There are several methods for detecting a moving object, one of which is, for example, determining the difference between two images. A difference Diff can be calculated from the following Expression 2 using colors and brightness signals. Note that in Expression 2, Y represents a brightness signal, and U and V represent color signals. Therefore, the difference Diff represents color difference.

$$Diff = \sqrt{(Y_{base} - Y_{oth})^2 + (U_{base} - U_{oth})^2 + (V_{base} - V_{oth})^2} \quad \text{[Expression 2]}$$

A saturated region exclusion unit 504 excludes the difference Diff in clipped-black brightness regions in the low-exposure image and the proper-exposure image, and the difference Diff in clipped-white brightness regions in the proper-exposure image and the high-exposure image. The purpose of this is to prevent the clipped-white regions and clipped-black regions from appearing as differences in the detection results of the moving object detection unit 503 and being misidentified as moving object regions. More specifically, the saturated region exclusion unit 504 excludes (by setting the signal value to zero), from the differences Diff, signal regions having a clipped-black brightness th1 or less and signal regions having a clipped-white brightness th2 or more in the reference image 501 and the aligned image 502.

An isolated region removal unit 505 removes, from the difference Diff, isolated regions caused by false detection of minute moving objects, non-moving objects in moving objects, and the like. This enables smooth and natural rendering of the boundaries of the moving object regions. There are several methods for removing an isolated region, for example, by reducing and expanding the difference Diff. In such a case, small regions misidentified as moving objects can be removed during a reducing phase, and non-moving object regions inside moving object regions can be compressed during a stage of expanding to the original size.

In FIG. 5B, the region compositing unit 510 obtains, from the region detection unit 500, a moving object detection image 511 representing moving object regions detected in the proper-exposure image and the low-exposure image and a moving object detection image 512 representing moving object regions detected in the proper-exposure image and the high-exposure image. A larger value selection unit 513 selects the larger values from the moving object detection image 511 and the moving object detection image 512. Since a moving object region is represented by signal values of one or more, an image representing all detected moving object regions can be obtained by selecting the larger signal values (pixel values) from corresponding pixels of the moving object detection image 511 and the moving object detection image 512. The operation of the moving object region detection unit 211 is as described above.

Figure 9:
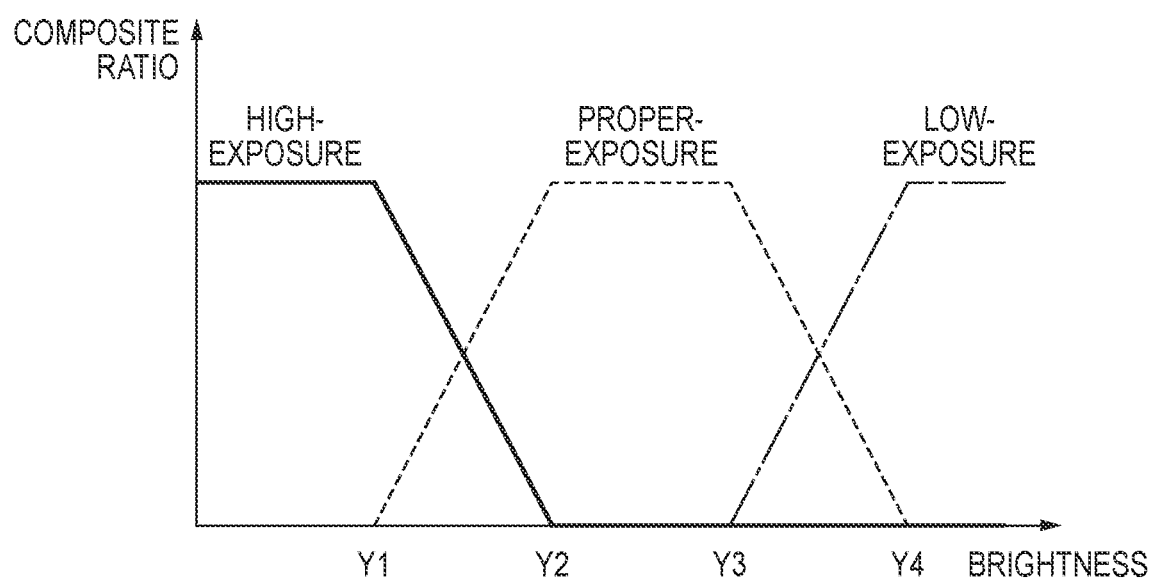
FIG. 9 is a diagram illustrating composite ratios.

Referring back to FIG. 3, in step S327, a composite ratio calculation unit 212 calculates composite ratios for compositing images in accordance with brightness values. The brightness values are the brightness values of the SDR image output from the registration correction unit 210. For example, based on the brightness value of each pixel in an SDR image converted from an HDR image obtained through HDR development of the proper-exposure image 202, the composite ratio calculation unit 212 obtains the composite ratio of each pixel for generating a composite image. FIG. 9 illustrates an example of composite ratios. According to the composite ratios in FIG. 9, a high-exposure image is used in the brightness range below a composite reference brightness threshold Y1, a proper-exposure image is used in the brightness range between composite reference brightness thresholds Y2 and Y3, and a low-exposure image is used in the brightness range greater than a composite reference brightness threshold Y4. In the intermediate ranges near the boundaries of the composite reference brightness thresholds Y1 and Y2 and the intermediate regions Y3 and Y4, the composite ratios are gradually changed to smoothen the switching of images.

In step S328, an image compositing unit 213 composites the multiple HDR images (high-exposure image 201, proper-exposure image 202, and low-exposure image 203 subjected to HDR development) output from the HDR developing unit 204, in accordance with the composite ratios calculated by the composite ratio calculation unit 212. The image compositing unit 213 corrects the moving object regions in the HDR composite image while referring to the moving object region information calculated by the moving object region detection unit 211. Various correction methods have been proposed, one of which is, for example, the technique disclosed in Japanese Patent No. 6046966. Japanese Patent No. 6046966 proposes a technique in which a moving object region in a composite image is replaced with an image obtained by adding together HDR images obtained from a low-exposure image, a proper-exposure image, and a high-exposure image, through weighted addition at a certain ratio. The image compositing unit 213 applies the technique of Japanese Patent No. 6046966 to the moving object regions detected by the moving object region detection unit 211. Since a composite ratio different from the composite ratios calculated by the composite ratio calculation unit 212 are used for the moving object regions in this way, a moving subject can be captured in a natural image without any strangeness.

According to the first embodiment as described above, since the composition information for compositing HDR images is generated using SDR images converted from HDR images, the accuracy of the composition information can be improved, and a high-quality composite image can be generated.

Second Embodiment

In the first embodiment, a configuration is described in which composition information (information on misregistration, information on moving object regions, etc.), which is information regarding composition, is generated using images obtained by converting HDR images to SDR images when compositing multiple HDR images. In the second embodiment, composite information is generated using images obtained by converting HDR images to linear spaces (hereinafter referred to as linear space images). This is due to the fact that the basic idea of the invention is to generate information regarding composition using images without gamma correction corresponding to an HDR standard or images less affected by gamma correction corresponding to an HDR standard.

Figure 7:
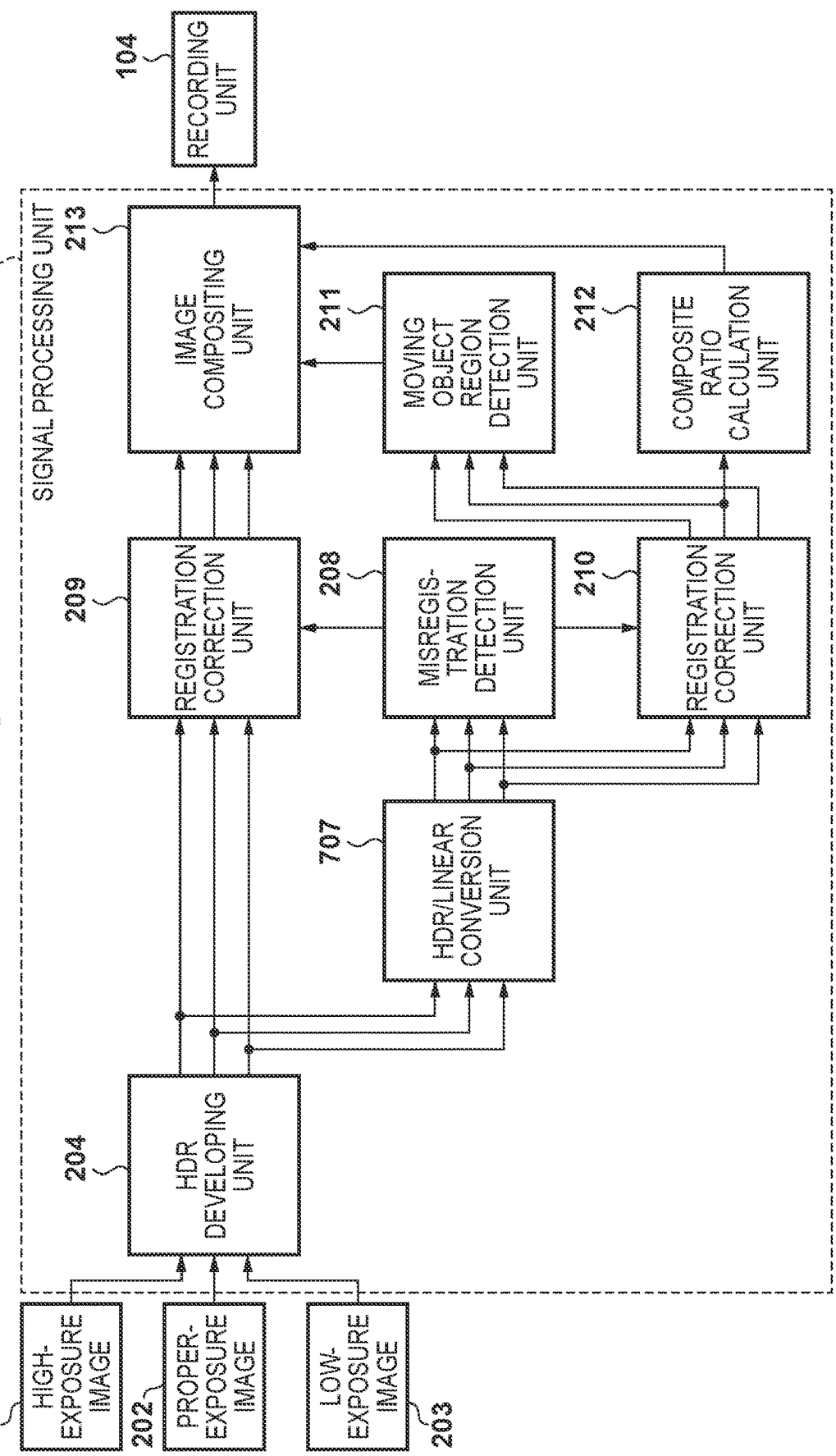
FIG. 7 is a block diagram illustrating a configuration example of a signal processing unit according to a second embodiment.

FIG. 7 is a block diagram illustrating a configuration example of the signal processing unit 103 according to the second embodiment. The same reference numbers denote configurations that are the same as those in the first embodiment (FIG. 2). In the configuration of FIG. 7, the HDR/SDR conversion unit 207 in FIG. 2 is replaced by an HDR/linear conversion unit 707.

The specific operation of the HDR/linear conversion unit 707 will now be described. In the following, the conversion method by the HDR/linear conversion unit 707 will be described using PQ gamma, which is an EOTF characteristic described in ST2084, as an example. PQ gamma is defined by the standard as in the following Expression 3.

$$P\_out = \left( \frac{c_1 + c_2 \cdot p\_in^{m_1}}{1 + c_3 \cdot p\_in^{m_1}} \right)^{m_2} \quad \text{[Expression 3]}$$

where $m_1$=0.1593017578125, $m_2$=78.84375, $c_1$=0.8359375, $c_2$=18.8515625, and $c_3$=18.6875.

In Expression 3, p_in is an R, G, or B signal obtained by normalizing a linear input signal to a value between 0.0 and 1.0, and can represent a brightness value corresponding to range between 0 to 10,000 cd/m². Similarly, p_out is an R, G, or B signal obtained by normalizing an output signal to a value between 0.0 and 1.0, where 1.0 corresponds to an upper limit of the output bit and 0.0 corresponds to the lower limit. For example, if the output bit is 10 bits, the upper limit is 1023 and the lower limit is 0. The HDR/linear conversion unit 707 performs the inverse transformation of Expression 3 (i.e., calculates p_in from p_out) to return an HDR image to a linear space, and thus obtains a linear space image. The misregistration detection unit 208 and the registration correction unit 210 respectively detect misregistration and correct the registration using the linear space image, which is an HDR image converted to a linear space.

Modification of Second Embodiment

Note that an image without gamma correction corresponding to an HDR standard, for example, the image before application of a gamma curve corresponding to an HDR standard, is being represented in a linear space. Therefore, the misregistration detection unit 208 and the registration correction unit 210 may respectively detect misregistration and correct the registration using an image that has not undergone the HDR development processing as a linear space image.

Figure 8:
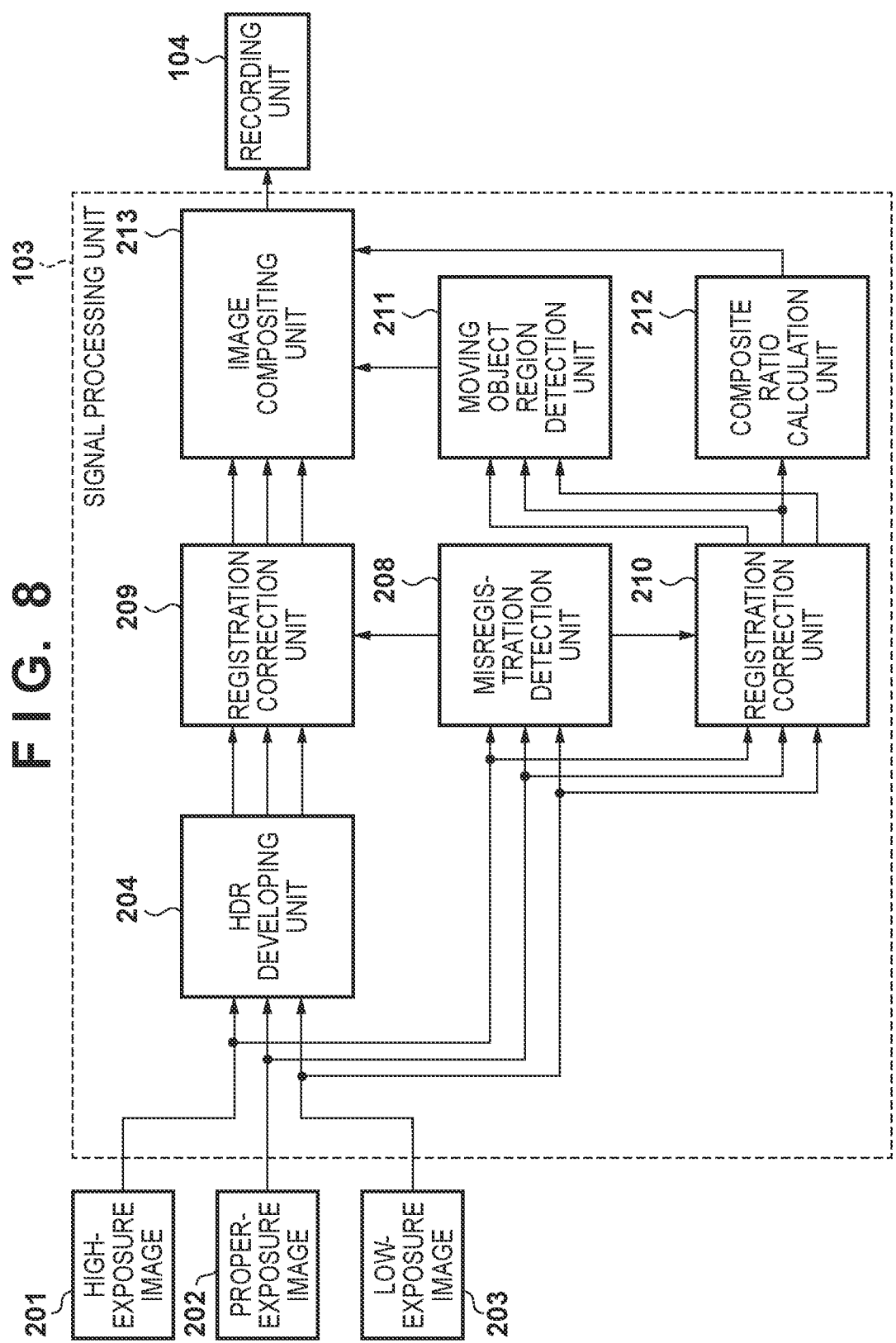
FIG. 8 is a block diagram illustrating another configuration example of a signal processing unit according to the second embodiment.

FIG. 8 is a block diagram illustrating a configuration example of the signal processing unit 103 according to a modification of the second embodiment. According to the configuration in FIG. 8, the high-exposure image 201, the proper-exposure image 202, and the low-exposure image 203 (all of which are linear space images) to be input to the HDR developing unit 204 are input to the misregistration detection unit 208 and the registration correction unit 210. Note that a linear space image in this embodiment refers to a sensor output of a Bayer array using RGB pixels or an RGB image in which Bayer signals are synchronized, and is not particularly limited so long as it is a linear space image.

Third Embodiment

In the first and second embodiments, a configuration is described in which multiple images captured under different exposure conditions are subjected to HDR development and the resulting multiple HDR images are composited; alternatively, multiple images may also be captured by changing image capturing conditions other than the exposure conditions. For example, processing known as depth composition described in Japanese Patent Laid-Open No. 2017-045030 and No. 2018-037857 may be used on HDR images. Depth composition is processing in which multiple images having different focus positions are composited to generate an image in which the entire subject is in focus. Depth composition will now be described in detail with reference to FIG. 10.

With reference to the image capturing composition denoted by reference number 1000 in FIG. 10, in a captured image 1010, the subject in the foreground is in focus, that is, the subject 1011 is in focus, but the subject 1012 is out of focus. In a captured image 1020, the subject in the background is in focus, that is, the subject 1022 is in focus, but the subject 1021 is out of focus. When composite ratios are calculated in accordance with the contrast values of these images, and multiple images are composited on the basis of the calculated composite ratios, an image, such as the composite image 1040, is generated in which the subject 1041 in the foreground and the subject 1042 in the background are both in focus.

The configuration of the signal processing unit 103 according to the third embodiment may have the configuration of either the first embodiment (FIG. 2) or the second embodiment (FIGS. 7 and 8). Note that, in the example of FIG. 10, two images, the captured images 1010 and 1020, are provided to the HDR developing unit 204, but it is not limited thereto. For example, three captured images may be provided to the HDR developing unit 204 by adding a captured image with a focus position in between the focus positions of the captured image 1010 and the captured image 1020.

Since HDR images (images developed by the HDR developing unit 204) that correspond to an HDR standard, such as ST 2084, have different tone characteristics of signals depending on the brightness of the subject, as described above, the contrast of the images may not be detected accurately. Therefore, as described in the first and second embodiments, by using any one of SDR images converted from HDR images, linear space images converted from HDR images, and images that have not undergone HDR development, the amount of misregistration between multiple images, the moving object regions, and composite ratios corresponding to contrast can be accurately calculated. That is, according to each of the above-described embodiments, highly accurate composition information can be generated by calculating composition information using images other than HDR images when multiple HDR images corresponding to ST 2084 or the like are to be composited.

Note that the present invention is not limited to the embodiments and can be applied to any mode of composition of HDR images obtained by subjecting multiple captured images to HDR development. Even when the development processing of the present invention is SDR development and SDR images are composited, the processing can be performed by not performing tone mapping (through-output in which tone compression is not performed in the full brightness range) by the HDR/SDR conversion unit 207.

As described above, according to each embodiment, the accuracy of the composition information used for composition of the developed images corresponding to an HDR standard is improved, and a high-quality composite image can be generated.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-176043, filed Sep. 26, 2019, which is hereby incorporated by reference herein in its entirety.

What is claimed is:

1. An image processing apparatus comprising:
at least one processor and/or at least one circuit, configured to function as a plurality of units comprising:
(1) an obtaining unit configured to obtain a plurality of captured images captured by an image capturing unit under different conditions;
(2) a developing unit configured to perform HDR development of the plurality of captured images to obtain a plurality of HDR images;
(3) a generating unit configured to generate composition information for compositing the plurality of HDR images, using a plurality of images corresponding to the plurality of captured images, the plurality of images being not influenced by or less influenced by tone processing resulting from the HDR development; and
(4) a compositing unit configured to composite the plurality of HDR images using the composition information.

2. The apparatus according to claim 1, wherein the at least one processor and/or at least one circuit is further configured to function as a converting unit configured to convert the plurality of HDR images to a plurality of SDR images, and
wherein the generating unit generates the composition information using the plurality of SDR images converted by the converting unit.

3. The apparatus according to claim 2, wherein the converting unit converts the plurality of HDR images to the plurality of SDR images by performing tone compression corresponding to brightness on each of the plurality of HDR images.

4. The apparatus according to claim 3, wherein the converting unit performs tone compression such that a tone of an HDR image near a proper level and a brightness level of an SDR image near a proper level are equivalent.

5. The apparatus according to claim 1, wherein the at least one processor and/or at least one circuit is further configured to function as a converting unit configured to convert the plurality of HDR images to a plurality of linear space images, the plurality of linear space images being obtained by converting the plurality of HDR images to linear spaces, and
wherein the generating unit generates the composition information using the plurality of linear space images converted by the converting unit.

6. The apparatus according to claim 5, wherein the converting unit converts an HDR image to a linear space image by applying an inverse transformation of gamma conversion to the HDR image, the gamma conversion being used by the developing unit for the HDR development.

7. The apparatus according to claim 1, wherein the generating unit generates the composition information using the plurality of captured images that have not been input to the developing unit.

8. The apparatus according to claim 1, wherein the composition information includes a first composite ratio indicating respective ratios of composition of pixels of the plurality of HDR images.

9. The apparatus according to claim 8, wherein the generating unit selects, from composite ratios set in advance in accordance with brightness, the first composite ratio of each pixel for compositing the plurality of HDR images, in accordance with brightness of each pixel in one of the plurality of images that are not influenced by or are less influenced by the HDR development.

10. The apparatus according to claim 1, wherein the composition information includes information for correcting misregistration that occurs between the plurality of HDR images.

11. The apparatus according to claim 1, wherein the composition information includes information indicating moving object regions present in the plurality of HDR images and a composite ratio used for compositing images of the moving object regions.

12. The apparatus according to claim 1, wherein the plurality of captured images are images captured under different exposure conditions.

13. The apparatus according to claim 1, wherein the plurality of captured images are images captured with different focus positions.

14. The apparatus according to claim 1, wherein the developing unit can obtain a plurality of SDR images by performing SDR development on the plurality of captured images, and
wherein when the developing unit performs the SDR development, the generating unit generates the composition information using the plurality of SDR images.

15. A method of processing an image, the method comprising:
obtaining a plurality of captured images captured by an image capturing unit under different conditions;
performing HDR development of the plurality of captured images to obtain a plurality of HDR images;
generating composition information for compositing the plurality of HDR images, using a plurality of images corresponding to the plurality of captured images, the plurality of images being not influenced by or less influenced by tone processing resulting from HDR development; and
compositing the plurality of HDR images using the composition information.

16. A non-transitory computer-readable storage medium storing a program for causing a computer to execute a method of processing an image, the method comprising:
obtaining a plurality of captured images captured by an image capturing unit under different conditions;
performing HDR development of the plurality of captured images to obtain a plurality of HDR images;
generating composition information for compositing the plurality of HDR images, using a plurality of images corresponding to the plurality of captured images, the plurality of images being not influenced by or less influenced by tone processing resulting from HDR development; and
compositing the plurality of HDR images using the composition information.

* * * * *